United States Patent Office 3,545,857
Patented Dec. 8, 1970

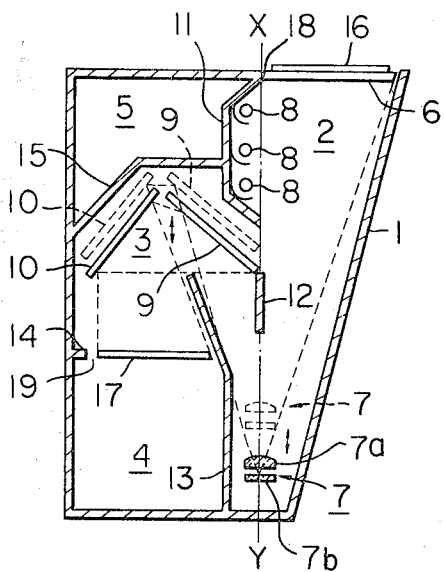

3,545,857
VARIABLE MAGNIFICATION EXPOSURE DEVICE FOR A REPRODUCTION APPARATUS
Yutaka Koizumi, Tokyo, Japan, assignor to Kabushiki Kaisha Ricoh, Tokyo, Japan
Filed Sept. 20, 1968, Ser. No. 761,124
Claims priority, application Japan, Sept. 29, 1967, 42/62,690
Int. Cl. G03b 27/34
U.S. Cl. 355—57        3 Claims

ABSTRACT OF THE DISCLOSURE

A reproduction apparatus comprises a reproduction lens system in a housing facing an original supported on a transparent plate covering an aperture, the reproduction lens system having a front lens and a rear mirror and being mounted for up-and-down movement on a vertical optical axis passing through one end of the aperture. A light source is positioned in the housing adjacent the aperture and on a side opposite the same respect to the optical axis for illuminating the original. A movable unit is mounted in the housing for reflecting an image from the lens system to photosensitive paper which is supported in the housing parallel to the original. The lens system and the mirrors of the movable unit are moved in the same direction to obtain variable magnification of reproduction.

---

The invention relates to a reproduction apparatus and in particular to a variable magnification exposure device in which a movable lens and two movable reflection mirrors are provided between an original and a photosensitive paper.

In a variable magnification exposure device for existing reproduction apparatus, in one arrangement any two of an original, a photosensitive paper and a lens are moved relative to the other, or in another arrangement the lens is mounted for replacement. The former arrangement is complicated in construction and is hard to handle because the moving parts for an original or a photosensitive paper are outside of the housing. Further, this arrangement is large in size and is liable to suffer accidental damage. The latter arrangement is expensive and is troublesome in the replacement of the lenses. Further, it has the drawback that a continuous magnification change is not obtainable.

It is, therefore, an object of the invention to provide a novel variable magnification exposure device which overcomes the above-noted disadvantages.

It is another object of the present invention to provide a reproduction apparatus wherein the restricted space within the apparatus is used most effectively, a wide range of variable magnification is achieved continuously, the size of the apparatus is decreased and the manipulation is easy.

With these and other objects in view, which will become apparent in the following detailed description, the present invention will be clearly understood in connection with the accompanying drawing, in which:

The single figure denotes a side sectional view of a reproduction apparatus equipped with a variable magnification exposure device in accordance with the present invention.

The interior of the reproduction apparatus 1 is divided into chambers 2, 3, 4 and 5 by providing partitions 11, 12, 13, 14 and 15. At the upper end of the chamber 2, there is an opening 18, and the opening 18 is provided with a transparent plate 6 on which an original 16 is to be placed. On the optical axis XY which is perpendicular to the transparent plate 6 and passes through one end of the plate 6, there is provided a movable lens 7 at the lower part of the chamber 2 for up and down movement. The lens 7 is an optical system consisting of a lens 7a and a mirror 7b. The partition 11 is offset from the optical axis XY in order to make a recessed region in which a plurality of light sources 8 are mounted. The light sources 8 are so provided that they illuminate original 16 but do not interfere with the light which passes from the original to lens 7. The partition 12 is on the optical axis XY and bisects the lens 7 so that one-half of lens 7 is placed opposite the transparent plate 6. Opposite the other half of the lens 7, there is provided an inclined movable mirror 9 in the chamber 3. Opposite the mirror 9, there is provided a movable, inclined reflection mirror 10, the mirrors 9 and 10 being mounted so that they can move parallel to themselves up and down. In the chamber 4, an opening 19 is provided, which is at a focus position when projecting the lens 7. The illuminated photosensitive paper 17 is fed to the opening 19 by a photosensitive paper feed and discharge device (not shown in the drawing). The illuminated photosensitive paper is discharged through a photosensitive paper discharge slot (not shown in the drawing) after it has been developed in a developer means (not shown in the drawing). In the chamber 5, there is housed a transformer and other electric parts (not shown in the drawing).

The lens 7 and the mirrors 9 and 10 shown in full lines are in a reproduction position of the least magnification and those in dotted lines are in a reproduction position of maximum magnification. The lens 7 and the mirrors 9 and 10 are moved together between the above-mentioned two positions by means not shown in the drawing. In any position the reflected light from the original 16 is focused upon the surface of the photosensitive paper 17, enabling the continuous variable magnification reproduction. The partitions 12 and 13 are so placed as not to interfere with the optical path of projection.

In the apparatus as described above, if the lens 7 and the mirrors 9 and 10 are set in a reproduction position of any desired magnification, an original 16 is placed upon the transparent plate 6 and the light sources 8 are turned on to illuminate the original 16, then the light from the original 16 impinges upon one half 7a of the lens 7, is reflected by the mirror 7b, passes again the other half of the lens 7a upwardly, is laterally reflected by mirror 9, is further reflected by the mirror 10 downwardly, and is focused upon photosensitive paper 17 to make a reproduction of any desired magnification. Next, if the light sources 8 are turned off and the photosensitive paper feed and discharge device is energized, the exposed photosensitive paper 17 is then fed through the developing means and is discharged, and a new photosensitive paper is fed in preparation for the next reproduction.

In the present invention for a reproduction apparatus, the original is placed parallel to but spaced from a photosensitive paper, the movable lens 7 and the first and a second movable mirrors 9 and 10 are placed between the original and the photosensitive paper, said lens 7 being freely movable along its optical axis while simultaneously said first and second mirrors 9 and 10 are moved as a unit freely parallel to said optical axis in unison with the movement of said lens 7, and in any position of the lens 7 and the second mirrors 9 and 10, the light from the original impinges upon the lens 7 through half of the lens with respect to its optical axis and is reflected, comes out from the other half of the lens, is reflected by the first mirror 9, passes to the second moving mirror, is further reflected by the second mirror, and is focused upon the photosensitive paper surface. In such a manner, the restricted space in a reproduction apparatus is used most effectively and a relatively long optical length is provided and enables a wide range of magnification. Therefore, the size of the reproduction apparatus is minimized and the apparatus is, further, easy to handle, since no moving parts for an original and a photosensitive paper are outside the housing.

What is claimed is:

1. A reproduction apparatus having a variable magnification exposure device comprising: a mounting table for an original having a housing with an aperture therein covered by a transparent plate, a reproduction lens system in said housing including a lens and a rear mirror, said lens system being mounted for up-and-down movement on a vertical optical axis passing through one end of said aperture, a light source in said housing adjacent said mounting table and on a side opposite the table with respect to the optical axis to illuminate the original so that an image thereof is transmitted to said lens system, and a movable unit in said housing comprising two opposed mirrors mounted for common up-and-down movement in fixed attitude parallel to the optical axis, said housing having an opening for photosensitive paper parallel to said original, said mirrors of said unit being positioned to reflect an image from the lens system to the photosensitive paper so that a light image of the original is projected onto the substantially parallel photosensitive paper, said reproduction lens system and said movable unit being moved in the same direction to obtain variable magnification of reproduction.

2. Apparatus as claimed in claim 1 wherein said lens of said system has a fixed focus.

3. Apparatus as claimed in claim 1 wherein said original and said photosensitive paper are stationary during reproduction and face one another.

References Cited

UNITED STATES PATENTS

| | | | |
|---|---|---|---|
| 3,364,816 | 1/1968 | Jeffree | 355—51 |
| 3,007,369 | 11/1961 | Squassoni et al. | 355—60X |

JOHN M. HORAN, Primary Examiner

K. C. HUTCHISON, Assistant Examiner

U.S. Cl. X.R.

355—60, 66